Oct. 20, 1953  M. A. STICKELBER  2,655,876
LOAF MOLDING MACHINE
Filed Aug. 21, 1950  3 Sheets-Sheet 1
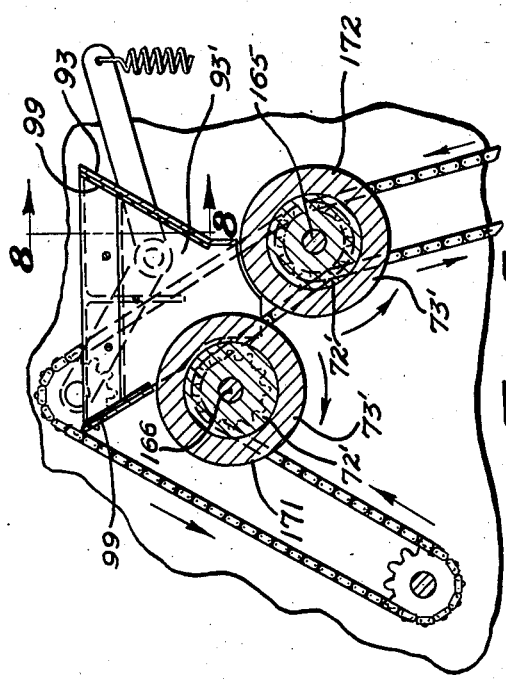
Fig. 5
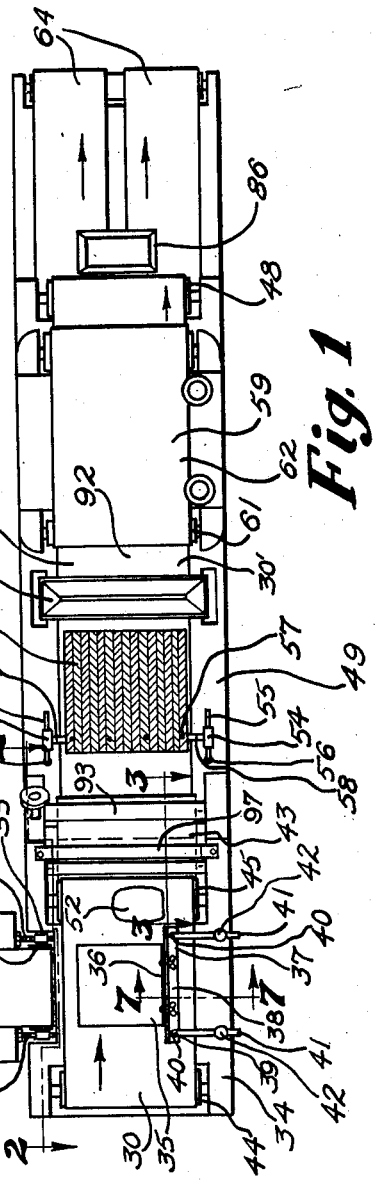
Fig. 1
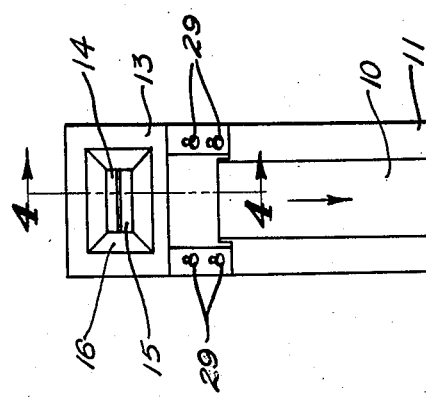
INVENTOR.
MERLIN A. STICKELBER
BY
Alfred R. Fuchs
ATTORNEY Oct. 20, 1953  M. A. STICKELBER  2,655,876
LOAF MOLDING MACHINE
Filed Aug. 21, 1950  3 Sheets-Sheet 2
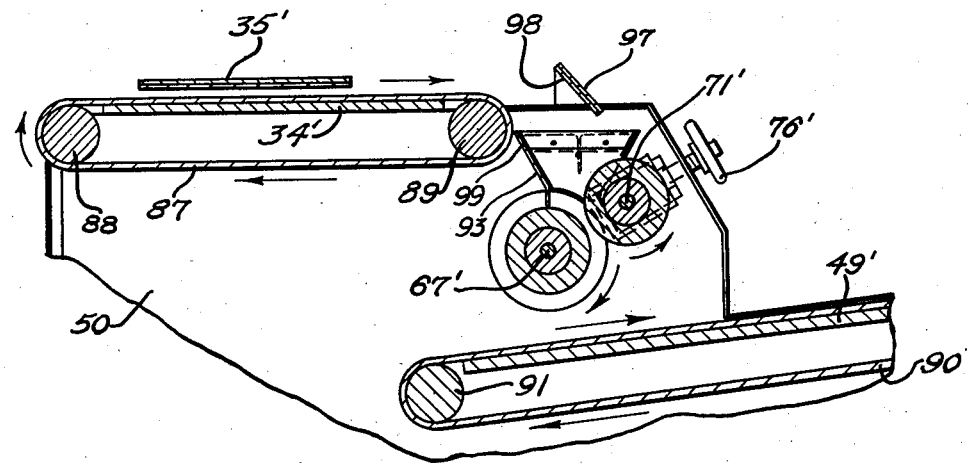
Fig. 6
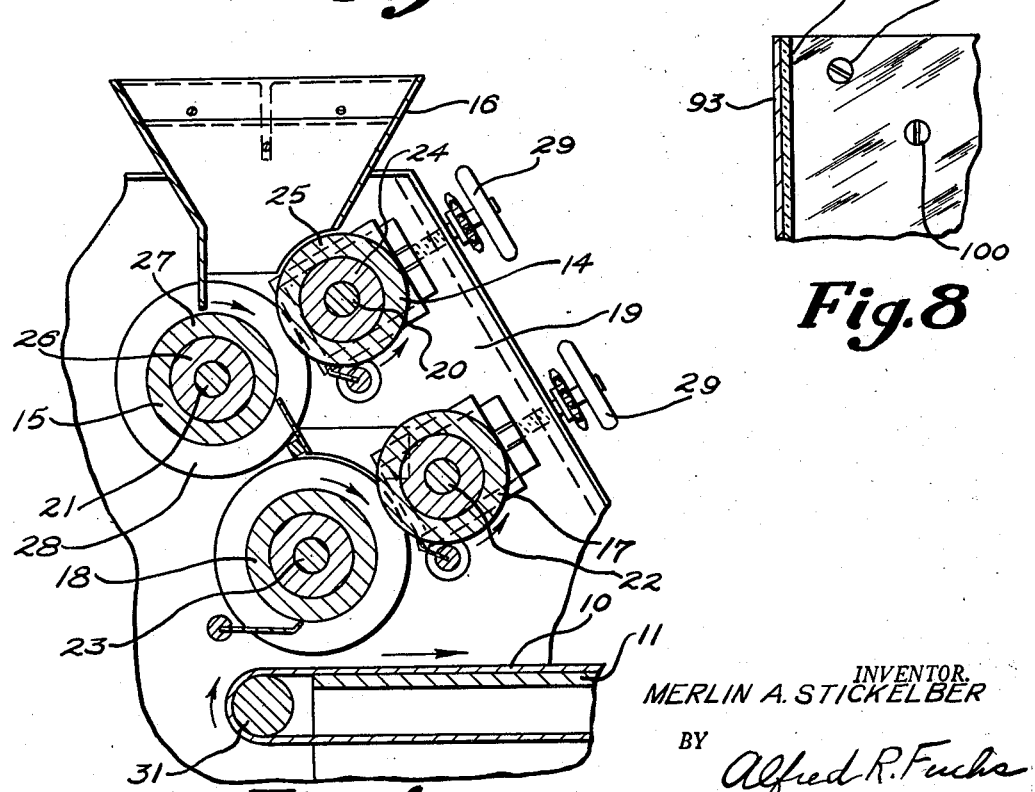
Fig. 8
Fig. 4
INVENTOR.
MERLIN A. STICKELBER
BY
Alfred R. Fuchs
ATTORNEY Oct. 20, 1953     M. A. STICKELBER     2,655,876
LOAF MOLDING MACHINE
Filed Aug. 21, 1950     3 Sheets-Sheet 3
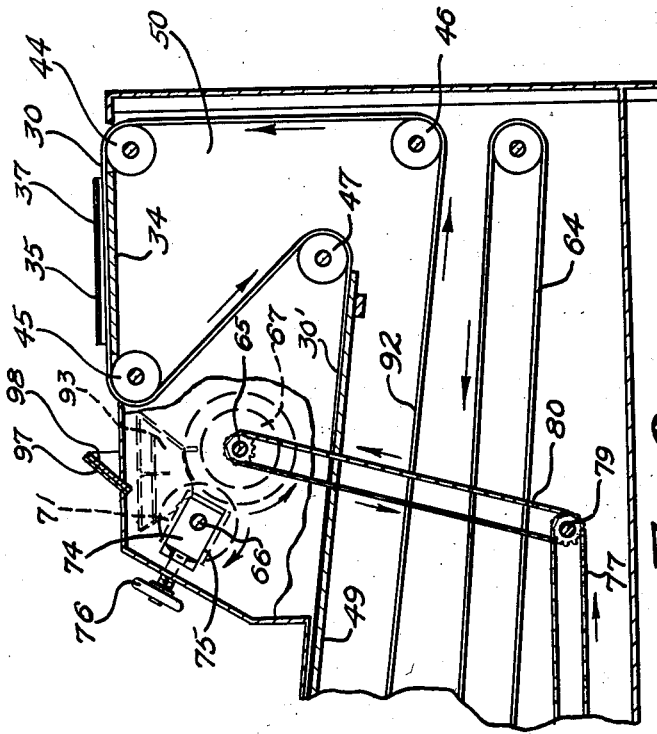
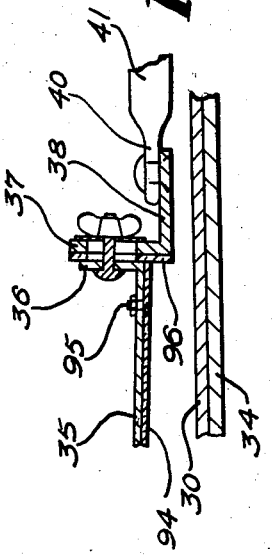
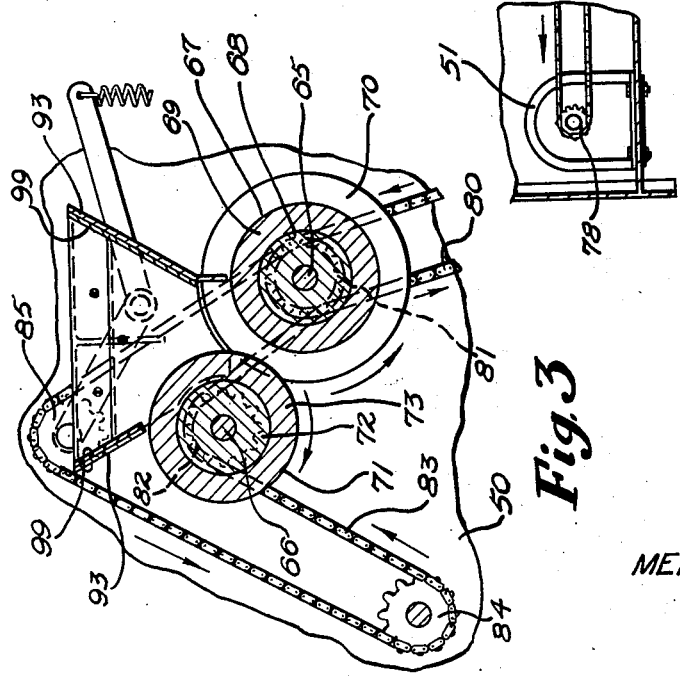
INVENTOR.
MERLIN A. STICKELBER
BY
Alfred R. Fuchs
ATTORNEY Patented Oct. 20, 1953

2,655,876

UNITED STATES PATENT OFFICE 2,655,876

LOAF MOLDING MACHINE

Merlin A. Stickelber, Kansas City, Mo., assignor to Stickelber & Sons, Inc., a corporation of Missouri Application August 21, 1950, Serial No. 180,516

12 Claims. (Cl. 107—12)

My invention relates to bread molding machines, and more particularly to a loaf forming machine and means for feeding the sheeted dough pieces from the sheeting mechanism to the curling mechanism of such a machine.

In the molding of bread loaves on a commercial scale it is customary to sheet rounded pieces of dough between rollers to produce a strip of dough that is elongated in the direction in which the rolling took place. It is also common practice to curl or coil up the sheeted dough piece on itself by means of a flexible member that engages a conveyor belt so as to cause the dough piece to be curled upon itself by movement lengthwise with the belt. It is also highly important to provide means for automatically panning the molded loaves of bread and to mold a loaf of bread that can be automatically panned without any difficulty. In order to do this, the loaves should be made of accurate length and be arranged at a definite position crosswise of the belt that is part of the curling mechanism.

In order to assure proper location of the sheeted dough piece relative to the belt with which the curling means cooperates, suitable guiding means and stop means are provided to locate the sheeted dough piece transversely of the conveyor belt forming part of the curling mechanism, so that said dough piece will properly engage the curling mechanism and the pressure board usually provided, to form a loaf that is of such length and so located on this conveyor belt that it will discharge in proper position to a pan on the pan conveyor to not overlap either end of the pan, without anyone having to do any panning by hand or otherwise rearrange the molded loaves in the pan.

In utilizing such guiding means, particularly stop means for limiting the transverse movement of sheeted pieces of dough across a conveyor belt feeding the dough pieces to the curling mechanism, it is customary to provide stop means that the then forward edge of the sheeted dough piece will engage to limit movement thereof crosswise of the conveyor belt, as shown and described in my co-pending application, Serial No. 4,294, filed January 26, 1948, on Transverse Curling Loaf Molding Mechanism, now Patent No. 2,467,612, dated August 4, 1953. Such halting by such stop means of the sheeted dough piece causes thickening of the end thereof that engages the stop means and sometimes creates a wrinkle in the sheeted dough piece. In transverse curling, this thickened portion becomes one side of the dough piece that is to be curled or one end of the loaf. Obviously, if there is considerably greater thickness of the dough piece at said side thereof, it will, when curled up, be multiplied so as to make a much larger in cross section loaf at one end of the molded piece of dough than at the other end thereof.

It is the principal purpose of my invention to provide, in a loaf molding machine, means for feeding the sheeted dough pieces to the curling mechanism, that comprises means for reducing the thickened edge portion so as to produce a dough piece of uniform thickness from side to side thereof and from end to end thereof, and to remove any wrinkles that might be in the dough piece due to having engaged with said stop means.

More specifically my invention comprises a conveying means operating in the same direction as the curling mechanism, and which may be a portion of the same conveyor belt, and a pair of cooperating rollers interposed between the said conveying means and the curling mechanism in a position to receive sheeted dough pieces from said conveying means and discharge the same onto the conveyor belt, or belt portion, which forms part of the curling mechanism, said rollers being similar to sheeting rollers and serving to re-shape the dough piece to the extent that it is of uniform thickness after passing between said rollers. Said rollers act as feed rollers and are adjustable in their spacing so as to get any desired reducing action of said rollers as the dough passes between them, thus re-shaping the dough pieces after these have been located transversely of said conveying means.

My invention is particularly adapted for use in connection with a transverse curling loaf forming mechanism, in which the dough pieces are discharged from a conveyor belt crosswise onto means for feeding the same to the curling mechanism. In my improved feeding means I provide an upper conveying means having its discharge end above the run of a conveyor belt with which a curling member engages, and provide paired sizing rollers between said conveying means and the said run of said conveyor belt, the upper conveying means feeding the dough pieces to the rollers and the rollers feeding the dough pieces to the run of the conveyor belt. The stop means is provided in cooperation with the upper conveying means forming part of the curling mechanism, and thus locates the dough pieces relative to both the upper and lower conveyor means transversely thereof.

While plain rollers may be used for both of the rollers of the pair, preferably, a flanged roller is used with a plain roller so as to definitely size the dough piece that is to be curled into a loaf, the flanged roller cooperating with the plain roller to determine the width of the dough piece, as well as to produce a uniform thickness thereof.

Another important feature of my invention is that the pair of sheeting rollers is preferably provided with an outer sleeve of polytetrafluoroethylene or similar material to which the dough will not stick, thus making it unnecessary to apply any flour to the sheeted dough piece passing between said rollers. Furthermore, if desired, said rollers can be adjusted to such a close spacing that the dough piece is sheeted transversely of the direction of original sheeting sufficiently to distort the cells in the dough piece in a different direction than the original sheeting operation distorted the same. Thus if desired, with my improved bread molding machine, it can be used either for transversely sheeting the dough piece if this should be desired, or merely for transverse curling. In either case a loaf that is uniform in size from one end to the other end thereof results because of the fact that the sheeted dough piece is of uniform thickness and of a definite width.

While the flanged roller will absolutely locate the dough piece relative to the curling conveyor belt, the same thing is true of unflanged rollers, for while some adjustment of the stop means may be necessary to get the exact location desired for the dough piece after passing between the sizing rollers, the adjustment of the stop means can be such that any widening of the dough piece at the thickened edge is compensated for so as to locate that side edge of the dough piece exactly the right distance from the side edge of the curling conveyor belt on which the same is deposited by the paired rollers that do the sizing.

Other objects and advantages of my invention will appear as the description of the drawings proceeds. I desire to have it understood, however, that I do not intend to limit myself to the particular details shown or described, except as defined in the claims.

In the drawings:

Fig. 1 is a top plan view of my improved bread molding machine.

Fig. 2 is a fragmentary longitudinal section on line 2—2 of Fig. 1, showing the feed and curling conveyor and its relation to the sizing rolls.

Fig. 3 is a fragmentary longitudinal section along line 3—3 of Fig. 1, showing the sizing rolls and drive mechanism.

Fig. 4 is a fragmentary section along line 4—4 of Fig. 1, showing the sheeting mechanism.

Fig. 5 is a fragmentary longitudinal section, showing another form of my invention, using two unflanged sizing rolls.

Fig. 6 is a fragmentary longitudinal section, showing another form of my invention, using separate conveyors for feeding to the sizing means and curling means.

Fig. 7 is a fragmentary section on the line 7—7 of Fig. 1 showing the construction of the stop plate, and Fig. 8 is a fragmentary section on line 8—8 of Fig. 5 through the end wall of sizing roll feed hopper.

Referring in detail to the drawings, in Fig. 1 is shown a bread molding machine that has a conveyor belt 10, which receives sheeted dough pieces from the sheeting mechanism, indicated generally by the numeral 13. The dough pieces that are to be sheeted between the rollers 14 and 15 are fed to said rollers in any desired manner, as through the hopper 16, to which these may be supplied by any suitable conveying means. The dough pieces that are fed into the hopper 16 are rounded dough pieces ordinarily, or may be pieces of dough that have been divided and not rounded, if this is found to be desirable. The dough pieces fed from the hopper 16 pass into engagement with the rollers 14 and 15, and after passing between rollers 14 and 15 to be sheeted thereby, pass between rollers 17 and 18, as shown in Fig. 4. The machine is provided with suitable means, such as a plate extending from adjacent roller 15 to adjacent roller 18 for guiding the dough pieces from the rollers 14 and 15 into engagement with the rollers 17 and 18.

The frame of the sheeting mechanism has a pair of side walls 19, which are provided with suitable bearings for the shafts 20, 21, 22 and 23, on which the sheeting rollers are mounted. On the shaft 20 is mounted a sheeting roller having a sleeve-like body portion 24 of steel and an outer sleeve-like body portion 25 of a polymer of tetrafluoroethylene, the characteristics of which are described in detail in my co-pending application, Serial No. 793,359, filed December 23, 1947, on Dough Sheeting Apparatus and Method. The steel body portion of the roller 14 is fixed on the shaft 20, and the sleeve-like dough contacting member 25 is fixed on the body portion 24 to rotate therewith.

Mounted on the shaft 21 is a sheeting roller having a sleeve-like steel body portion 26, which is fixed on the shaft 21 to rotate therewith, and mounted on said body portion 26 is an outer sleeve 27 forming the dough contacting surface of the roller, which is made of said tetrafluoroethylene polymer, above referred to. The roller mounted on the shaft 21 has flanges 28 thereon, between which the roller on the shaft 20 fits. The roller on shaft 20 is designated generally by the numeral 14 and the roller on shaft 21 is designated generally by the numeral 15, said rollers rotating in the direction of the arrows thereon in Fig. 4.

The shafts 20 and 22 are adjustable toward and away from the rollers 15 and 18. The adjustable mounting for the shafts 20 and 22 is described in detail in my Patent No. 2,600,281, on Sheeted Dough Transfer Conveyor, patented June 10, 1952. Hand wheels 29 are used for adjustment of the shafts 20 and 22. The conveyor belt 10 receives sheeted dough pieces from the sheeting mechanism 13, the conveyor belt 10 being mounted on a suitable frame 11, on which are mounted rollers 12 and 31, over which the belt operates, one of said rollers, such as 31, being driven in any suitable manner in the direction indicated by the arrow thereon in Figs. 1 and 4. The roller 12 is adjustably mounted on the frame, the adjusting means being indicated at 32. Said conveyor belt 10 discharges the pieces of sheeted dough with considerable momentum across the upper run 30 of conveyor belt 92 off the end of said conveyor belt 10. Said conveyor belt 10 extends into a recess 33 provided in the table-like member 34, over which the upper run 30 of the conveyor belt operates.

The dough pieces are discharged from the end of the conveyor belt 10 onto the upper run 30 of the conveyor belt 92. They have a tendency to travel somewhat upwardly relative to the run 30 of the conveyor because of the momentum with which these are discharged from the conveyor belt 10. In order to prevent any upward movement of the sheeted dough pieces away from said belt conveyor, which might prevent the flatwise engagement of the sheeted pieces of dough with the run 30 thereof when the same finally engage therewith, a deflector plate 35 is provided, which is of substantially the width of the conveyor belt 10 and extends across a major portion of the width of the run 30 of said conveyor belt, and is generally rectangular in character, having a marginal flange 36 thereon that extends at an angle that is slightly oblique to the body portion 35 of said plate, so that when said plate is secured in position, as described below, the marginal edge of said plate that is nearest the conveyor belt 10 will be inclined upwardly above the edge thereof that has the upstanding flange 36. As a result, the plate 35 acts as an effective guiding means and deflecting means to direct the sheeted pieces of dough downwardly into engagement with the upper run 30 of the conveyor belt 92, so as to rest flatly thereon upon engagement with said conveyor belt. The stop means preferably comprises an angular guide member 37, which has a horizontal flange 38 that is pivotally connected by pivot members 39 with enlargements 40 on the end portions of rod-like members 41, said rod-like members being mounted in suitable brackets 42 that are provided with clamping means for adjustably securing the rod-like members in position. As shown in Fig. 7 the deflector plate 35 is provided with a sheet of tetrafluoroethylene polymer 94 on its dough contacting surface, secured by fastening elements 95. Similarly stop means 37 is provided with a sheet of tetrafluoroethylene polymer 96 on its dough contacting surface.

The sheeted dough pieces are discharged from the conveyor 10 of the sheeting device to the upper portion or run 30 of the conveyor 92, which feeds the dough pieces into sizing rolls, indicated generally by the numeral 43 in Fig. 1. The engagement of the dough pieces discharged from the conveyor 10 to the run 30 of said conveyor with the guide member 37 of the stop means causes a thickening of the then forward edge portion of the sheeted dough pieces and sometimes some wrinkling thereof. This thickening and accompanying wrinkling is removed by passing the sheeted dough piece through the paired feed and sizing rollers 43, to be described in detail later. The run 30 of conveyor belt 92 is guided over the upper table-like member 34 by the rollers 44 and 45. The rollers 46, 47 and 48 guide lower run 30' of conveyor 92 over the lower table-like portion 49 of the loaf forming unit. The lower portion or run 30' is thus located for the curling and loaf forming operations. Rollers 44, 45, 46 and 48 all rotate in fixed bearings mounted on a pair of side walls 50 of the loaf forming and panning unit. The roller 47 is mounted in a movable bearing on the side wall 50 in any suitable manner for adjusting the tension of conveyor belt 92. The conveyor belt 92 as shown in Fig. 2, is a continuous belt driven in the direction of the arrows from the gear reducer 51 in any desired manner (not shown).

It will be obvious from the above that the dough pieces that have been sheeted, such as the sheeted dough pieces 52, will all thus be located in the same position transversely of the upper run 30 of conveyor 92 by the guide member 37 on the stop plate 35 for the remaining loaf forming operations. The flexible curling member 53 is of flexible chain mesh material and has its lower extremity dragging on the lower run 30' of conveyor belt 92 so that when dough pieces that have been sheeted engage therewith the leading edges of the dough pieces will be turned over on the dough piece and thus curling over or turning over action will continue until the dough piece has been completely curled or rolled up on itself. The flexible curling member 53 is adjustable in the usual manner to obtain the desired position thereof on run 30' of the belt 92 by means of bracket members 54 that are adjustably mounted on the horizontal arms 55 of the upstanding brackets 56.

The brackets 56 are rigidly mounted on the frame or lower table member 49 and further adjustment of the chain mesh member 53 is provided by the pins 57 provided on the transverse bar 58 extending between the brackets 54.

From the curling member 53 the dough piece continues on the lower inclined run 30' of belt conveyor 92 to the pressure board 59. A suitable amount of dusting flour is added by the dusting device of a well known type, indicated generally by the numeral 60, to the tacky outer surface of the rolled up dough piece before passing under the pressure board. The pressure board 59 has a roller 61 mounted at its forward end, over which the belt 62 extends. The belt 62 is normally stationary, but can be moved when this is desired in order to present different portions thereof for engagement with the curled up pieces of dough. As the curled up piece of dough passes under the pressure board it is raised, this being possible due to the fact that the pressure board is mounted for sliding movement up and down as the dough piece passes underneath it. The pressure board normally engages the dough pieces by the action of gravity, pressing down on the dough pieces so as to firmly seal the adjacent surfaces of the layers or plies of dough in the curled up piece together, and eventually firmly sealing the closing edge of the curled up piece to the adjacent body portion thereof. The curled up piece of dough rolls over on its longitudinal axis a number of times in passing along under the pressure board, because of the dragging action exerted by the pressure board and the forward movement of the rolled up dough piece due to the action of the conveyor belt. The molded loaves thus formed are then carried by the run 30' of the conveyor belt to the pans, which are delivered in timed relation to the loaves by a pan conveyor 64 driven in the direction of the arrow shown in Fig. 2, and controlled and driven by suitable means, not forming part of this invention.

The feeding and sizing rolls, indicated generally by the numeral 43, are mounted on shafts 65 and 66 (see Figs. 2 and 3), mounted in suitable bearings on the side walls 50 of the loaf forming and panning unit. Mounted on the shaft 65 is a sizing roller 67 having a sleeve-like steel body portion 68, which is fixed on the shaft 65 to rotate therewith, and mounted on said body portion 68 is an outer sleeve 69 forming the dough contacting surface of the roller, which is made of a tetrafluoroethylene polymer, as previously referred to in connection with the sheeting mechanism. The roller 67 has flanges 70 thereon, between which the roller on shaft 66 fits. The roller on shaft 66 is designated generally by the numeral 71 and consists of the sleeve-like steel body portion 72, which is fixed on the shaft 66 to rotate therewith. An outer sleeve 73 of this unflanged roller 71 forming the dough contacting surface thereof is also made of the tetrafluoroethylene polymer, and is fixed on the body portion 72. The shaft 66 is adjustable toward and away from the shaft 65 and thus the roller 71 is adjustable toward and away from the roller 67.

The drive mechanism for the rollers 66 and 67 is shown in Figs. 2 and 3. The idler shaft 79 is driven by the chain 77 from the gear reducer 51 through the sprocket 78. The roller 67 mounted on shaft 65 is driven from the idler shaft 79 by the chain 80 in the direction shown by the arrow in Fig. 2. The shafts 66 and 65 are caused to rotate in opposite directions but at the same speed, by the chain arrangement shown in Fig. 3. The sprocket 81 is fixed on the shaft 65 and the sprocket 82 is fixed on the shaft 66, the chain 83 moving in the direction of the arrow passes over the sprocket 82 and under the sprocket 81 and is adjusted by the idler sprockets 84 and 85 as the roller 71 is adjusted toward or away from the roller 67. The sprocket 84 is mounted in fixed bearings on the side wall 50, while the sprocket 85 is mounted in suitable movable bearings on the side wall 50 for adjusting the tension of the chain 83.

A hopper 93 may be provided for directing the sheeted dough pieces from the run 30 of the conveyor belt to the sizing rollers 67 and 71. Guide plate 97 with a dough contacting surface 98 of tetrafluoroethylene polymer, mounted rigidly on the upper table portion 34 of the loaf forming unit, lies at an oblique angle to the upper run 30 of the conveyor belt and beyond the end thereof. The hopper 93 is also lined with tetrafluoroethylene polymer as shown in Fig. 8. The lining 99 is secured by fastening elements 100. The guide plate 97 serves as means for deflecting the sheeted dough pieces downwardly into the hopper 93 upon discharge thereof endwise from the conveyor run 30.

The dough pieces, after passing between the sizing rollers, will be deposited on the lower run 30' of the conveyor belt 92 and carried thereby to the flexible curling member 53. The sizing rollers shown in Figs. 2 and 3 will not only locate the sheeted dough pieces definitely transversely of the run 30' of the conveyor belt, but will determine the exact width thereof, as well as produce a uniform thickness of the sheeted dough pieces, eliminating any thickened edge portion that may have resulted due to engagement with the stop means cooperating with the upper run 30 of said conveyor belt and any wrinkles that might have resulted in the dough piece due to engagement with the stop means or deflector plate 35. The roller 71 is adjustable to any desired position relative to the roller 67 so that if more than mere elimination of a thickened edge and wrinkled portion of the dough piece is desired the same can be set so that the dough piece will be sheeted transversely of the direction in which it was sheeted by the sheeting mechanism, or in other words, the rollers can be so set as to materially reduce the thickness of the sheeted dough piece, if this is desired by the user of the machine. Under any circumstances, the rollers 67 and 71 cooperate to reshape the dough piece so that it is of uniform thickness and uniform width.

In the operation of my improved loaf molding machine, rounded or divided dough pieces are deposited in the hopper 16 by any suitable conveying means. The dough pieces are then sheeted by two pairs of sheeting rollers 14, 15, 17 and 18. The sheeted dough pieces carried from the sheeting mechanism to the loaf forming and panning unit by conveyor belt 10 are discharged on run 30 of conveyor belt 92 where they engage the stop plate 35, which exactly positions said dough pieces for the remaining loaf forming operations. The sheeted dough piece having contacted the guide 37 on the deflector plate 35 with considerable momentum has a thickened edge portion which must be removed before it is coiled up on itself to form the loaf, if a loaf of uniform size from end to end is desired. The sheeted dough piece having the thickened edge is carried from the upper portion or run 30 of conveyor belt 92 to the sizing rollers 43, where it is reshaped and made of uniform width and thickness for the curling operation. The reshaped dough piece is deposited on the lower portion or run 30' of the belt conveyor by the sizing rollers 43 and passes under the curling means 53 where it is coiled up on itself and progresses along the conveyor belt 30 to the pressure board 59. The flour duster 60 adds a small amount of dusting flour to reduce the tackiness of the outer surface before the dough piece passes under the pressure board. The completed loaves are discharged off the end of the run 30' of the conveyor into the pans 86, where they are carried off by the panning conveyor 64. As all the dough pieces will be located in exactly the right position transversely of the conveyor belt run 30' by the combined action of the stop means and the sizing rollers, the molded loaves will be located exactly right for deposit into the pans without any overlapping thereof. Due to the action of the sizing means the loaves will be of uniform cross section from end to end thereof when these pass into the pans.

Shown in Fig. 6 is a modification of my loaf forming and panning unit using two separate conveyor belts 87 and 90 in place of the one continuous belt 92, as shown in Fig. 2. The belt 87 is mounted on rollers 88 and 89, which rotate in fixed bearings on the side walls 50 of the loaf forming and panning unit, and moves over the upper table portion 34' of said unit. The belt 87 receives sheeted dough pieces from the sheeting mechanism as previously described for discharge into the sizing rollers 67' and 71'. A stop plate 35', mounted in the same manner as the stop plate 35, shown in Figs. 1 and 2, is provided to position the dough pieces on the belt 87 in the proper relation for entry into the sizing rolls. The sizing rolls 67' and 71' are constructed and driven in the same manner as the rolls 67 and 71, shown in Figs. 2 and 3, and adjusted in the same manner by hand wheel 76'. The conveyor belt 90 replaces the lower run 30' of conveyor belt 92 and moves over the lower table portion 49', corresponding to table portion 49, and roller 91 to deliver the pieces of dough of uniform width and thickness from the sizing rolls to the curling mechanism. The belts 87 and 90 are driven in any suitable manner from a gear reducer, similar to that shown in Fig. 2.

Another modification of my machine is shown in Fig. 5, where two unflanged rollers 171 and 172 are used for sizing the dough pieces. The rollers 171 and 172 are constructed the same as roller 71, shown in Figs. 2 and 3, with an outer sleeve 73' made of a polymer of tetrafluoroethylene and mounted rigidly on the steel sleeve-like portion 72', which is fixed to rotate with the shafts 166 and 165. The shaft 166 is adjustable toward and away from the shaft 165 in a similar manner to shaft 66 and thus roller 171 is adjustable toward and away from roller 172 to vary the thickness of the sized dough piece. The drive for shafts 166 and 165 is the same as for the shafts 66 and 65 shown in Fig. 3 Positioning of the dough piece for the final curling and loaf forming operation is done by adjusting the stop plate 35 as shown in Fig. 1 to discharge the dough piece into the hopper 93' for proper entrance into the sizing rolls 171 and 172 after these have been adjusted to their desired spacing. The discharge of the dough piece from the sizing rollers 171 and 172 at the proper place on the lower belt conveyor 90 will determine the proper position of the formed loaf in the pan. Therefore all the adjustment for the proper position of the dough piece on the belt for the sizing, curling and loaf forming operations in this form of the invention is made by varying the position of the stop plate with respect to the belt.

What I claim is:

1. In a bread molding machine, means for feeding sheeted dough pieces from a sheeting mechanism to a curling conveyor means, comprising upper conveying means above and operating in the same direction as said curling conveyor means, means discharging sheeted dough pieces from said sheeting mechanism onto said upper conveying means, and a pair of cooperating rollers below the discharge end of said upper conveying means in a position to receive sheeted dough pieces from said upper conveying means and above said curling conveyor means to discharge said dough pieces therefrom onto said curling conveyor means, said upper conveying means and said curling conveyor means being portions of the same belt conveyor offset from each other.

2. In a bread molding machine having a sheeting mechanism and a curling conveyor belt, means for feeding sheeted dough pieces from said sheeting mechanism to said curling conveyor belt, comprising belt conveying means above and traveling in the same direction as said curling conveyor belt, means discharging sheeted dough pieces onto said conveying means from said sheeting mechanism in a path transverse to the direction of movement of said conveying means, stop means located between the marginal edges of said conveying means and extending across said path to definitely locate the sheeted dough pieces discharged onto said conveying means between the sides thereof, a pair of cooperating rollers below the discharge end of said conveying means in a position to receive sheeted dough pieces from said conveying means and above said curling conveyor belt to discharge said dough pieces therefrom onto said curling conveyor belt, and means for directing sheeted dough pieces discharged from said conveying means between said rollers, comprising a hopper leading to said rollers and means above said hopper beyond the discharge end of said conveying means for deflecting said dough pieces into said hopper.

3. In a bread molding machine having a sheeting mechanism and a curling conveyor belt, means for feeding sheeted dough pieces from said sheeting mechanism to said curling conveyor belt, comprising belt conveying means above and traveling in the same direction as said curling conveyor belt, means discharging sheeted dough pieces onto said conveying means from said sheeting mechanism in a path transverse to the direction of movement of said conveying means, stop means located between the marginal edges of said conveying means and extending across said path to definitely locate the sheeted dough pieces discharged onto said conveying means between the sides thereof, a pair of cooperating rollers below the discharge end of said conveying means in a position to receive sheeted dough pieces from said conveying means and above said curling conveyor belt to discharge said dough pieces therefrom onto said curling conveyor belt, and means for directing sheeted dough pieces discharged from said conveying means between said rollers, comprising a hopper leading to said rollers and an inclined plate extending across the path of discharge of said dough pieces from said conveying means above said hopper.

4. In a bread molding machine having a sheeting mechanism and a curling conveyor belt, means for feeding sheeted dough pieces from said sheeting mechanism to said curling conveyor belt, comprising belt conveying means above and traveling in the same direction as said curling conveyor belt, means discharging sheeted dough pieces onto said conveying means from said sheeting mechanism in a path transverse to the direction of movement of said conveying means, stop means located between the marginal edges of said conveying means and extending across said path to definitely locate the sheeted dough pieces discharged onto said conveying means between the sides thereof, a pair of cooperating rollers below the discharge end of said conveying means in a position to receive sheeted dough pieces from said conveying means and above said curling conveyor belt, and means for directing sheeted dough pieces discharged from said conveying means between said rollers, comprising a hopper leading to said rollers and an inclined plate extending across the path of discharge of said dough pieces from said conveying means above said hopper, said plate having a polytetrafluoroethylene dough engaging face, and said hopper having a polytetrafluoroethylene lining.

5. In a bread molding machine having a sheeting mechanism and a curling conveyor belt, means for feeding sheeted dough pieces from said sheeting mechanism to said curling conveyor belt, comprising belt conveying means traveling in the same direction as said curling conveyor belt, feeding means traveling in a direction transversely of said conveying means to discharge sheeted dough pieces from said sheeting mechanism transversely onto said conveying means, a stop member located between the marginal edges of said conveying means and extending across the path of the dough pieces discharged from said feeding means, and a pair of cooperating rollers interposed between said conveying means and said curling conveyor belt in a position to receive sheeted dough pieces from said conveying means between the same, said rollers being horizontally spaced to define a passage therebetween opening downwardly onto said curling conveyor belt to discharge said dough pieces upon said curling conveyor belt from between said rollers.

6. In a bread molding machine having a sheeting mechanism and a curling conveyor belt, means for feeding sheeted dough pieces from said sheeting mechanism to said curling conveyor belt, comprising belt conveying means traveling in the same direction as said curling conveyor belt, means discharging sheeted dough pieces onto said conveying means from said sheeting mechanism in a path transverse to the direction of movement of said conveying means, stop means overlying said conveying means and cooperating therewith, said stop means being located between the marginal edges of said conveying means and extending across said path to definitely locate the sheeted dough pieces discharged onto said conveying means between the sides thereof, and a pair of cooperating rollers interposed between the discharge end of said conveying means and said curling conveyor belt in a position to receive sheeted dough pieces from said conveying means and discharge the same onto said curling conveyor belt.

7. In a bread molding machine having a sheeting mechanism and a curling conveyor belt, means for feeding sheeted dough pieces from said sheeting mechanism to said curling conveyor belt, comprising belt conveying means traveling in the same direction as said curling conveyor belt, means discharging sheeted dough pieces onto said conveying means from said sheeting mechanism in a path transverse to the direction of movement of said conveying means, stop means overlying said conveying means and cooperating therewith, said stop means being located between the marginal edges of said conveying means and extending across said path to definitely locate the sheeted dough pieces discharged onto said conveying means between the sides thereof, and means for rolling said dough pieces to a uniform thickness interposed between the discharge end of said conveying means and said curling conveyor belt in a position to receive sheeted dough pieces from said conveying means and discharge the same onto said curling conveyor belt.

8. In a bread molding machine having a sheeting mechanism and a curling conveyor belt, means for feeding sheeted dough pieces from said sheeting mechanism to said curling conveyor belt, comprising belt conveying means traveling in the same direction as said curling conveyor belt, means discharging sheeted dough pieces onto said conveying means from said sheeting mechanism in a path transverse to the direction of movement of said conveying means, stop means overlying said conveying means and cooperating therewith, said stop means being located between the marginal edges of said conveying means and extending across said path to definitely locate the sheeted dough pieces discharged onto said conveying means between the sides thereof, and a pair of relatively adjustable sheeting rollers interposed between said conveying means and said curling conveyor belt in a position to receive sheeted dough pieces from said conveying means, said rollers being horizontally spaced to provide a passage between the same opening downwardly onto said curling conveyor belt to discharge said dough pieces upon said curling conveyor belt from between said rollers.

9. In a bread molding machine having a sheeting mechanism and a curling conveyor belt, means for feeding sheeted dough pieces from said sheeting mechanism to said curling conveyor belt, comprising belt conveying means traveling in the same direction as said curling conveyor belt, means discharging sheeted dough pieces onto said conveying means from said sheeting mechanism in a path transverse to the direction of movements of said conveying means, stop means located between the marginal edges of said conveying means and extending across said path to definitely locate the sheeted dough pieces discharged onto said conveying means between the sides thereof, and means for gauging the width and thickness of said dough pieces interposed between said conveying means and said curling conveyor belt in a position to receive sheeted dough pieces from said conveying means and discharge the same onto said curling conveyor belt, comprising a pair of cooperating rollers, one roller of said pair being flanged and the other roller of said pair fitting between the flanges thereof.

10. In a bread molding machine having a sheeting mechanism and a curling conveyor belt, means for feeding sheeted dough pieces from said sheeting mechanism to said curling conveyor belt, comprising an upper conveyor belt traveling in the same direction as said curling conveyor belt, means discharging sheeted dough pieces onto said conveying means from said sheeting mechanism in a path transverse to the direction of movement of said upper conveyor belt, stop means located between the marginal edges of said upper conveyor belt and extending across said path to definitely locate the sheeted dough pieces discharged onto said upper conveyor belt between the sides thereof, and a pair of cooperating rollers interposed between the discharge end of said upper conveyor belt and curling conveyor belt above said curling conveyor belt in a position to receive sheeted dough pieces from said upper conveyor belt and discharge said dough pieces downwardly onto said curling conveyor belt.

11. In a bread molding machine having a sheeting mechanism and a curling conveyor belt, means for feeding sheeted dough pieces from said sheeting mechanism to said curling conveyor belt, comprising belt conveying means traveling in the same direction as said curling conveyor belt, feeding means traveling in a direction transversely of said conveying means to discharge sheeted dough pieces from said sheeting mechanism transversely onto said conveying means, a stop member having an upstanding stop wall having a facing of polytetrafluoroethylene thereon located between the marginal edges of said conveying means and extending across the path of the dough pieces discharged from said feeding means, and a pair of cooperating rollers interposed between said conveying means and said curling conveyor belt in a position to receive sheeted dough pieces from said conveying means between the same, said rollers being horizontally spaced to define a passage therebetween opening downwardly onto said curling conveyor belt to discharge said dough pieces upon said curling conveyor belt from between said rollers.

12. In a bread molding machine having a sheeting mechanism and a curling conveyor belt, means for feeding sheeted dough pieces from said sheeting mechanism to said curling conveyor belt, comprising belt conveying means traveling in the same direction as said curling conveyor belt, means discharging sheeted dough pieces onto said conveying means from said sheeting mechanism in a path transverse to the direction of movement of said conveying means, stop means located between the marginal edges of said conveying means and extending across said path to definitely locate the sheeted dough pieces discharged onto said conveying means between the side edges thereof, said sheeted dough pieces being thickened adjacent the edge thereof engaging said stop means by engagement with said stop means, and means for reshaping said sheeted dough pieces to a uniform thickness located between said conveying means and said curling conveyor belt.

MERLIN A. STICKELBER.

References Cited in the file of this patent

UNITED STATES PATENTS

| Number | Name | Date |
|---|---|---|
| 1,148,005 | Bogdanffy | July 27, 1915 |
| 1,657,018 | Larraburu | Jan. 24, 1928 |
| 1,949,105 | Lauterbur et al. | Feb. 27, 1934 |
| 2,021,251 | Brykczynski | Nov. 19, 1935 |
| 2,077,896 | Quick | Apr. 20, 1937 |
| 2,320,797 | Robinson et al. | June 1, 1943 |
| 2,373,012 | Burdett | Apr. 3, 1945 |
| 2,403,476 | Berry et al. | July 9, 1946 |
| 2,479,864 | Rhodes | Aug. 23, 1949 |
| 2,534,734 | Rhodes | Dec. 19, 1950 |
| 2,586,089 | Rhodes | Feb. 19, 1952 |